United States Patent [19]

Henzi

[11] Patent Number: 4,889,535
[45] Date of Patent: Dec. 26, 1989

[54] 4-SUBSTITUTED BENZOTHIAZOL-2-YLAZO-N-C8-14-ALKYKL-N-(2'-CYANOETHYL)ANILINES OPTIONALLY HAVING A 3-C1-4-ALKYL GROUP

[75] Inventor: Beat Henzi, Basle, Switzerland

[73] Assignee: Sandoz Ltd., Basle, Switzerland

[21] Appl. No.: 25,318

[22] Filed: Mar. 13, 1987

Related U.S. Application Data

[63] Continuation-in-part of Ser. No. 839,854, Mar. 14, 1986, abandoned.

[30] Foreign Application Priority Data

Mar. 18, 1985 [DE] Fed. Rep. of Germany ....... 3509651
Dec. 19, 1985 [DE] Fed. Rep. of Germany ....... 3544917

[51] Int. Cl.⁴ ............ C09B 29/045; C09B 29/085; C09B 67/22; D06P 1/18
[52] U.S. Cl. ........................... 8/639; 534/581; 534/573; 534/788; 8/691
[58] Field of Search ............ 534/573 L, 573 M, 788; 8/639, 691

[56] References Cited

U.S. PATENT DOCUMENTS

| | | | |
|---|---|---|---|
| 3,502,645 | 3/1970 | Carmichael | 534/788 |
| 4,488,992 | 12/1984 | Yoshinaga et al. | 534/788 |
| 4,619,893 | 10/1986 | Takagi et al. | 534/788 X |

FOREIGN PATENT DOCUMENTS

| | | | |
|---|---|---|---|
| 570128 | 2/1959 | Canada | 534/788 |
| 1135593 | 8/1962 | Fed. Rep. of Germany | 534/788 |
| 2053079 | 3/1972 | Fed. Rep. of Germany | 534/788 |
| 44-13389 | 6/1969 | Japan | 534/788 |
| 45-7712 | 3/1970 | Japan | 534/788 |
| 47-49164 | of 1972 | Japan | 534/788 |
| 56-91081 | 7/1981 | Japan | 534/788 |
| 2144443 | 3/1985 | United Kingdom | 534/788 |
| 2163174 | 2/1986 | United Kingdom | 534/788 |

*Primary Examiner*—Floyd D. Higel
*Attorney, Agent, or Firm*—Gerald D. Sharkin; Richard E. Vila; Melvyn M. Kassenoff

[57] ABSTRACT

Compounds of the formula

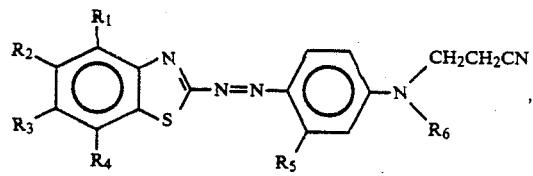

and mixtures thereof,
wherein $R_1$ is hydrogen, chloro or bromo,
$R_2$ is hydrogen, chloro, bromo or nitro,
$R_3$ is hydrogen, chloro, bromo, nitro or –SCN,
$R_4$ is hydrogen, chloro or bromo,
$R_5$ is hydrogen or $C_{1-4}$alkyl, and
$R_6$ is $C_{8-14}$alkyl, with the provisos that (i) at least one of $R_1$, $R_2$, $R_3$ and $R_4$ is other than hydrogen, (ii) when $R_3$ is nitro or —SCN, $R_2$ is other than nitro, and (iii) when two or more of $R_1$, $R_2$, $R_3$ and $R_4$ are halo, then $R_3$ is one of those halos, are useful as disperse dyes for dyeing substrates such as synthetic and semi-synthetic, hydrophobic, high molecular weight organic materials.

19 Claims, No Drawings

4-SUBSTITUTED BENZOTHIAZOL-2-YLAZO-N-C8-14-ALKYKL-N-(2'-CYANOETHYL)ANILINES OPTIONALLY HAVING A 3-C1-4-ALKYL GROUP

This is a continuation-in-part of application Ser. No. 06/839,854, filed Mar. 14, 1986 and now abandoned.

This invention relates to monoazo compounds suitable as disperse dyes for dyeing substrates such as synthetic and semi-synthetic hydrophobic high molecular weight organic materials.

According to the invention there is provided compounds of the formula

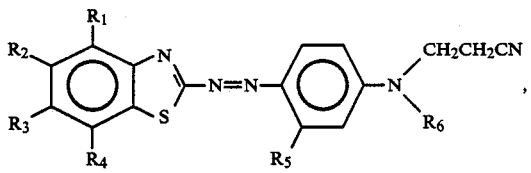

wherein
$R_1$ is hydrogen, chloro or bromo,
$R_2$ is hydrogen, chloro, bromo or nitro,
$R_3$ is hydrogen, chloro, bromo, nitro or —SCN,
$R_4$ is hydrogen, chloro or bromo,
$R_5$ is hydrogen or $C_{1-4}$alkyl, and
$R_6$ is $C_{8-14}$alkyl,
with the provisos that (i) at least one of $R_1$, $R_2$, $R_3$ and $R_4$ is other than hydrogen, (ii) when $R_3$ is nitro or —SCN, $R_2$ is other than nitro, and (iii) when two or more of $R_1$, $R_2$, $R_3$ and $R_4$ are halo, then $R_3$ is one of those halos, and mixtures of such compounds.

Preferably, at least one of $R_1$, $R_3$ and $R_4$ is other than hydrogen.

Preferably, $R_1$ is hydrogen.

Preferably, $R_5$ is $R_5'$, where $R_5'$ is hydrogen, methyl or ethyl; more preferably, it is $R_5''$, where $R_5''$ is hydrogen or methyl.

Preferably, $R_6$ is $R_{6a}$, where $R_{6a}$ is n-$C_{10-14}$alkyl; more preferably, it is $R_6'$, where $R_6'$ is n-$C_{10-12}$alkyl (i.e., linear $C_{10-12}$alkyl).

Preferably when $R_2$ or $R_3$ is nitro, then $R_6$ is $C_{10-14}$alkyl.

Preferred groups of compounds of formula I include those (i) wherein one of $R_2$ and $R_4$ is chloro or bromo and the other is hydrogen, and $R_3$ is chloro or bromo,
(ii) of (i) wherein $R_6$ is n-$C_{10-12}$alkyl,
(iii) of (ii) wherein one of $R_2$ and $R_4$ is chloro and the other is hydrogen, and $R_3$ is chloro,
(iv) of (iii) wherein $R_1$ is hydrogen,
(v) of (iv) wherein $R_5$ is hydrogen or methyl,
(vi) of (i) wherein (a) $R_3$ and $R_2$ or $R_4$ are both chloro or (b) $R_3$ and $R_2$ or $R_4$ are both bromo,
(vii) of (vi) wherein $R_1$ is hydrogen,
(viii) of (vii) wherein $R_6$ is n-$C_{10-12}$alkyl,
(ix) of (viii) wherein $R_5$ is hydrogen or methyl,
(x) wherein $R_2$ is nitro, $R_3$ is hydrogen, and $R_4$ is hydrogen,
(xi) of (x) wherein $R_1$ is hydrogen,
(xii) of (xi) wherein $R_6$ is n-dodecyl,
(xiii) of (xii) wherein $R_5$ is hydrogen or methyl,
(xiv) wherein $R_2$ is hydrogen, $R_3$ is nitro or —SCN, and $R_4$ is hydrogen,
(xv) of (xiv) wherein $R_6$ is n-dodecyl,
(xvi) of (xiv) wherein $R_1$ is hydrogen,
(xvii) of (xvi) wherein $R_5$ is hydrogen or methyl,
(xviii) of (xvii) wherein $R_6$ is n-$C_{10-12}$alkyl,
(xix) of (xviii) wherein $R_6$ is n-dodecyl,
(xx)–(xxv) of (xiv)–(xix) wherein $R_3$ is nitro, and
(xxvi) of (xi) wherein $R_5$ is hydrogen or methyl.

Preferred groups of mixtures include mixtures of (xxvii)–(xxxv) two compounds of any of (i)–(ix) that are identical except that in one compound $R_2$ is chloro or bromo, and $R_4$ is hydrogen and in the other $R_2$ is hydrogen, and $R_4$ chloro or bromo, (xxxvi) two or three compounds of formula I that differ solely with respect to $R_6$, (xxxvii)–(xlv) four to six compounds of any of (i)–(ix) consisting of two or three pairs of compounds that are identical except that in one compound of the pair $R_2$ is chloro or bromo, and $R_4$ is hydrogen and in the other compound of the pair $R_2$ is hydrogen, and $R_4$ is chloro or bromo, the pairs of compounds differing from each other solely with respect to $R_6$, and (xlvi)–(lxiv) two or three compounds of any of (x), (xi), (xiv)–(xviii), (xx), (xxii), and (xxvi) that differ solely with respect to $R_6$.

In each of Groups (i), (vi), (vii), (x), (xi), (xiv), (xvi), (xvii), (xx), (xxiii), (xxvi), therefor (xxvii), (xxxii), (xxxiii), (xxxvi), (xxxvii), (xlii), (xliii), (xlvi)–(l) and (lii)–(liv) each $R_6$ is preferably $C_{10-14}$alkyl and more preferably n-$C_{10-14}$alkyl.

Except where indicated to the contrary, all alkyl groups are linear or branched.

The compounds of formula I can be prepared by coupling a diazotised amine of the formula

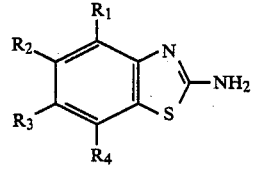

to a compound of the formula

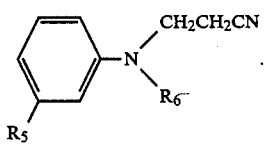

The mixtures may be prepared by mixing the individual components thereof or by utilizing in the aforementioned process a mixture of diazotised amines of formula II and/or a mixture of compounds of formula III.

Compounds of formulae II and III are either known or may be prepared from appropriate compounds by known methods.

Diazotisation and coupling can be carried out by known methods.

The dyes according to the invention are in general applied to the substrate as dyeing preparations, by padding, printing or exhaust dyeing.

The formulation of the dyes according to the invention into dyeing preparations can be carried out by known methods, e.g., by milling in the presence of a dispersing agent or filler.

The dyes according to the invention exhaust well from a suspension at temperatures over 120° C. onto textile material made of fully synthetic or semi-synthetic hydrophobic, high molecular weight organic material. The dyes according to the invention are particularly useful for dyeing, padding or printing textile material comprising fibres of linear aromatic polyester.

Dyeing, padding or printing can be carried out according to known methods, for example as described in French Patent 1,445,371.

Dyeings made with dyes according to the invention have excellent wet fastness properties and excellent fastness to contact after thermal treatment (e.g., after heat-setting with or without a finishing agent) and resin-finishing. Besides these good properties the dyeings exhibit other good fastness properties normally associated with disperse dyes.

The invention will now be illustrated by the following Examples in which all parts and percentages are by weight and all temperatures are in °C.

EXAMPLE 1

11.5 Parts of a technical mixture of 2-amino-5,6-dichlorobenzothiazole and 2-amino-6,7-dichlorobenzothiazole (95%) are dissolved in 23 parts of glacial acetic acid, 2.5 parts of propionic acid and 41 parts of 85% phosphoric acid at 45°-50°. The solution is cooled to 0°-5° and diazotised at this temperature with 17.5 parts of 40% nitrosylsulphuric acid and stirred for 3 hours. The resultant diazonium salt solution is slowly cooled to 0° C. and a solution of 14.9 parts of N-β-cyanoethyl-N-decylaniline (96%) in 110 parts of glacial acetic acid, 35 parts of water, 60 parts of ice and 3.5 parts of amidosulphonic acid is added. The resulting precipitate is a rubine-red dyestuff is filtered, washed until acid-free and dried at 60° under vacuum. The dyestuff can be purified by column chromatography (eluant: Toluene/methyl ethyl ketone) λmax of the purified compound in DMF is 522 nm.

Modified Procedure 11.5 Parts of a technical mixture of 2-amino-5,6-dichlorobenzothiazole and 2-amino-6,7-dichlorobenzothiazole (95%) are dissolved in a mixture of 23 parts of glacial acetic acid, 2.5 parts of propionic acid and 41 parts of 85% phosphoric acid at 45°-50° C. The solution is cooled to −5°-0° C., diazotised at this temperature with 16.7 parts of 40% nitrosylsulphuric acid and stirred for 3 hours. A solution of 14.9 parts N-β-cyanoethyl-N-decylaniline (96%), 1.2 parts of an emulsifier (e.g., an emulsifier consisting of, by weight, 99.7% of the reaction product of castor oil and ethylene oxide containing an average of 32 ethylene oxide units per molecule and 0.3% of sodium chloride) and 0.5 part of amidosulphonic acid in 22 parts of glacial acetic acid is made up at 25°-30° C. To this solution the diazonium salt solution and 80 parts of ice cold water are added simultaneously. The resulting precipitate is a rubine red dye. It is isolated and may be purified as set forth in the preceding paragraph.

EXAMPLES 2-8

Mixtures of compounds of the formula

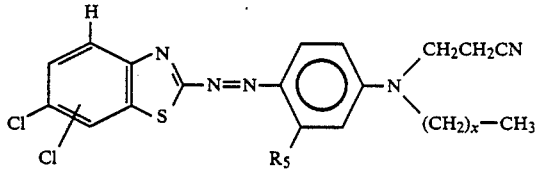

in which $R_5$ and x are as defined in the Table 1 below can be made by a method analogous to that of Example 1 from the same diazo component and appropriate coupling components.

TABLE 1

| Ex. No. | $R_5$ | x | $\lambda_{in\ nm}^{max}$ |
| --- | --- | --- | --- |
| 2 | H | 10 | 522 |
| 3 | H | 11 | 522 |
| 4 | H | 13 | 522 |
| 5 | —CH$_3$ | 9 | 529 |
| 6 | —CH$_3$ | 10 | 529 |
| 7 | —CH$_3$ | 11 | 529 |
| 8 | —CH$_3$ | 13 | 529 |

EXAMPLES 9-13

Mixtures of compounds of the formula

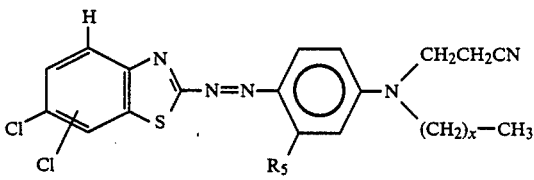

in which $R_5$, x and the ratio of compounds are given in Table 2 below, can be made by a method analogous to that of Example 1 from the same diazo component and suitable coupling components.

TABLE 2

| Ex. No. | $R_5$ | x | Ratio of compounds % | max |
| --- | --- | --- | --- | --- |
| 9 | H | 9 | 85 | 522 |
|   | H | 11 | 15 |  |
| 10 | H | 8 | 20 | 522 |
|    | H | 9 | 60 |  |
|    | H | 11 | 20 |  |
| 11 | H | 9 | 70 | 522 |
|    | H | 11 | 30 |  |
| 12 | —CH$_3$ | 9 | 70 | 529 |
|    | —CH$_3$ | 11 | 30 |  |
| 13 | —CH$_3$ | 9 | 9 | 529 |
|    | —CH$_3$ | 11 | 15 |  |

EXAMPLES 14-16

In a method analogous to that of Example 1 compounds can be prepared from the following diazo and coupling components.

In Examples 14 and 15 the diazo component is a technical mixture of 2-amino-5,6-dibromobenzothiazolyl-2 and 2-amino-6,7-dibromobenzothiazolyl-2 and in Example 16 the diazo component is the technical mixture of Example 1. The coupling components are given in Table 3 below together with the λmax of the resulting dyestuffs.

TABLE 3

| Ex. No. | Coupling component | λ max in nm |
|---|---|---|
| 14 | N—β-cyanoethyl-N—decylaniline | 522 |
| 15 | N—β-cyanoethyl-N—decyl-m-toluidine | 529 |
| 16 | 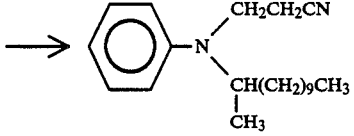 | 522 |

The arrow in the above table indicates where coupling occurs.

EXAMPLE 17

Into a mixture of 150 parts of 85% phosphoric acid, 90 parts of glacial acetic acid and 8.5 parts of propionic acid, 20.1 parts of 2-amino-6-nitrobenzothiazole (97%) are dissolved at 50°–55° and the solution, after cooling to −5°, is diazotised with 35 parts of nitrosylsulphuric acid (40%). The resulting brown solution is then diluted with 160 parts of water and at the same time a solution, consisting of 31 parts N-dodecyl-N-(2'-cyanoethyl-)aminobenzene (100%) (in the form of 35 parts of about 88% compound), 170 parts of glacial acetic acid, 2 parts of a commercially available surfactant (the reaction product of 32 moles of ethylene oxide and 1 mole of castor oil) and 0.5 parts of aminosulphonic acid, is added whilst stirring well at 20° to 30°.

The resulting dyestuff is filtered, washed neutral with water at 80° and vacuum dried at 50°.

The impure dyestuff (circa 85%) can be purified by recrystallisation or column chromatography (eluant: toluene/ethyl methyl ketone).

A compound of formula 17a

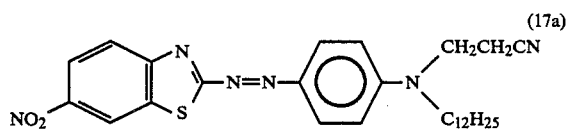

(17a)

λ max in DMF: 543 nm results; it dyes polyester and PES/cellulose fibre material a clear bordeaux red colour. The dyeings have excellent wet fastness properties.

EXAMPLES 18–28

Compounds of the formula

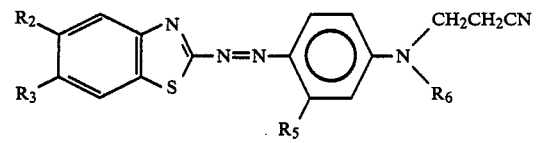

in which the symbols are defined in Table 4 below can be prepared from appropriate reactants by a method analogous to that of Example 17 above.

TABLE 4

| Ex. No. | $R_2$ | $R_3$ | $R_5$ | $R_6$ | Nuance of dyeing on PES | max in nm |
|---|---|---|---|---|---|---|
| 18 | H | —$NO_2$ | H | —$C_{11}H_{23}$ | bluish-red | 543 |
| 19 | H | —$NO_2$ | H | —$C_{14}H_{29}$ | bluish-red | 543 |
| 20 | H | —$NO_2$ | $CH_3$ | —$C_{12}H_{25}$ | reddish-violet | 551 |
| 21 | —$NO_2$ | H | H | —$C_{11}H_{23}$ | yellowish-red | 520 |
| 22 | —$NO_2$ | H | H | —$C_{12}H_{25}$ | yellowish-red | 520 |
| 23 | —$NO_2$ | H | —$CH_3$ | —$C_{12}H_{25}$ | red | 528 |
| 24 | H | —SCN | H | —$C_{10}H_{21}$ | yellowish-red | 521 |
| 25 | H | —SCN | H | —$C_{11}H_{23}$ | yellowish-red | 521 |
| 26 | H | —SCN | H | —$C_{12}H_{25}$ | yellowish-red | 521 |
| 27 | H | —SCN | —$CH_3$ | —$C_{12}H_{25}$ | red | 529 |
| 28 | H | —$NO_2$ | H | 1:2 mixture of —$C_{11}H_{23}$ and —$C_{12}H_{25}$ | bluish-red | 543 |

APPLICATION EXAMPLE

The dyestuff produced according to Example 1 is sandmilled in the presence of a dispersing agent (e.g., a commercially available lignosulphonate) and is then atomised to form an ultradisperse preparation having an average particle size of 1μ and a dyestuff/coupage ratio of 3.5:10.

24 Parts of this preparation are dispersed in 1000 parts of water and are added to a circulating liquor (13,000 parts containing 30 parts ammonium sulphate, 0.3 parts of formic acid as buffer, 13 parts of sulphonated castor oil and optionally a carrier/levelling combination) of a dyeing autoclave at 60°.

A pre-cleaned, pressed crosswound spool (1000 parts of polyester yarn on a plastic spool) is immersed to the bath and the dyeing autoclave is closed and heated over 35 minutes to 130° to 135°. After 90 minutes the temperature is reduced to 80° and the circulating liquor is removed. The dyed substrate is thoroughly washed with cold water and then reductively cleared. The substrate is then rinsed and then dried. The resultant dyeing is a deep, level scarlet-red dyeing free of residues.

Instead of using the compound of Example 1, an appropriate amount of the compound of any one of Examples 2–28 may be used instead.

The decyl groups in Examples 1, 14 and 15 are linear. The $C_{10-14}$alkyl groups of Examples 17–28 are linear.

What is claimed is:

1. A compound of the formula

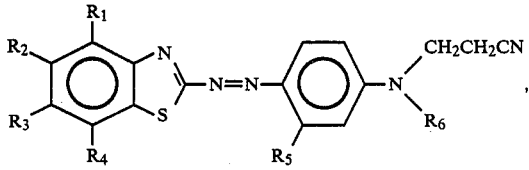

or a mixture thereof, wherein $R_1$ is hydrogen, chloro or bromo,
$R_2$ is hydrogen, chloro, bromo or nitro,
$R_3$ is hydrogen, chloro or bromo,
$R_4$ is hydrogen, chloro or bromo,
$R_5$ is hydrogen or $C_{1-4}$alkyl, and
$R_6$ is $C_{10-14}$alkyl,
with provisos that (i) at least one of $R_1$, $R_2$, $R_3$ and $R_4$ is other than hydrogen, and (ii) when two or more of $R_1$, $R_2$, $R_3$ and $R_4$ are halo, then $R_3$ is one of those halos.

2. A compound according to claim 1.

3. A compound according to claim 1, or a mixture thereof, wherein $R_1$ is hydrogen.

4. A compound according to claim 1, or a mixture thereof, wherein $R_5$ is hydrogen, methyl or ethyl.

5. A compound according to claim 4, or a mixture thereof, wherein $R_5$ is hydrogen or methyl.

6. A compound according to claim 1, or a mixture thereof, wherein $R_6$ is n-$C_{10-12}$alkyl.

7. A compound according to claim 1 wherein
$R_2$ is nitro,
$R_3$ is hydrogen, and
$R_4$ is hydrogen.

8. A compound according to claim 7 wherein
$R_1$ is hydrogen,
$R_5$ is hydrogen or methyl, and
$R_6$ is n-dodecyl.

9. A substrate to which a compound according to claim 1, or a mixture thereof, has been applied.

10. A compound of the formula

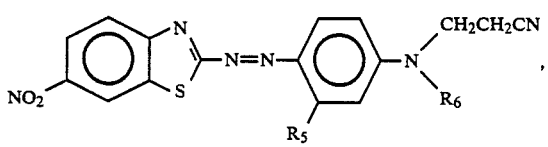

wherein
$R_5$ is hydrogen or $C_{1-4}$alkyl, and
$R_6$ is $C_{10-14}$alkyl.

11. A compound according to claim 10 wherein $R_5$ is hydrogen or methyl.

12. A compound according to claim 11 wherein $R_6$ is n-$C_{10-12}$alkyl.

13. A compound of the formula

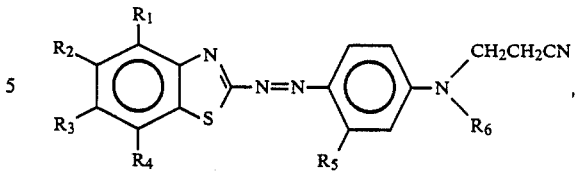

or a mixture thereof, wherein
$R_1$ is hydrogen, chloro or bromo,
one of $R_2$ and $R_4$ is chloro or bromo and the other is hydrogen,
$R_3$ is chloro or bromo,
$R_5$ is hydrogen or $C_{1-4}$alkyl, and
$R_6$ is $C_{8-14}$alkyl.

14. A compound according to claim 13, or a mixture thereof, wherein $R_6$ is n-$C_{10-12}$alkyl.

15. A compound according to claim 14, or a mixture thereof, wherein
$R_1$ is hydrogen,
$R_3$ and $R_2$ or $R_4$ are both chloro or
$R_3$ and $R_2$ or $R_4$ are both bromo, and
$R_5$ is hydrogen or methyl.

16. A compound according to claim 15.

17. A mixture according to claim 15, said mixture consisting essentially of two compounds that are identical except that in one compound $R_2$ is chloro or bromo, and $R_4$ is hydrogen and in the other $R_2$ is hydrogen, and $R_4$ is chloro or bromo.

18. A mixture according to claim 17 consisting essentially of the two compounds of the formula

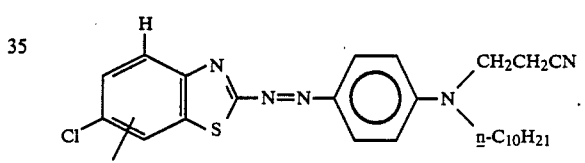

19. A mixture according to claim 17 consisting essentially of the two compounds of the formula

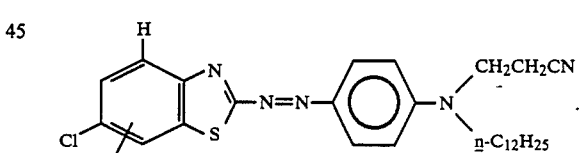

* * * * *